United States Patent [19]

Bannon

[11] 4,308,131

[45] Dec. 29, 1981

[54] METHOD OF IMPROVING THERMAL EFFICIENCY OF SIDEDRAW FRACTIONATING COLUMNS

[75] Inventor: Robert P. Bannon, Houston, Tex.

[73] Assignee: Shell Oil Company, Houston, Tex.

[21] Appl. No.: 155,703

[22] Filed: Jun. 2, 1980

[51] Int. Cl.³ .......................... C10G 7/00; B01D 3/16
[52] U.S. Cl. .................................. 208/353; 208/355; 208/358
[58] Field of Search ............... 208/352, 355, 358, 361, 208/353

[56] References Cited

U.S. PATENT DOCUMENTS

| | | | |
|---|---|---|---|
| 2,323,047 | 6/1943 | Jewell | 208/358 |
| 2,534,870 | 12/1950 | Kraft | 208/358 |
| 2,853,439 | 9/1958 | Ernst, Jr. | 208/355 |
| 3,301,778 | 1/1967 | Cabbage | 208/355 |
| 3,383,308 | 5/1968 | Wickham | 208/355 |

Primary Examiner—T. M. Tufariello

[57] ABSTRACT

An improved process for the fractional distillation of a multi-component liquid in a multiple tray fractional distillation column having at least one sidedraw tray is disclosed, the process being characterized by elimination of draw tray overflow from at least one sidedraw tray, provision of a circulating reflux, and removal of reflux from the locus of the circulating reflux withdrawal zone.

5 Claims, 5 Drawing Figures

METHOD OF IMPROVING THERMAL EFFICIENCY OF SIDEDRAW FRACTIONATING COLUMNS

BACKGROUND OF THE INVENTION

Spiraling energy costs have renewed interest recently in the recovery of energy from a variety of energy sources. In particular, the recovery of thermal energy from chemical plant and refinery process streams has received considerable attention. Multiple sidedraw fractionating columns, such as crude oil distilling columns, catalytic cracking unit main fractionators, and thermal cracking unit fractionators, commonly have one or more circulating reflux systems to recover heat for reuse.

In the typical configuration of these systems, reflux liquid is withdrawn from the column, preferably a few trays below a sidedraw tray, circulated through heat exchangers, and returned to the column at the tray just below the side draw tray. Such liquid is normally referred to as circulating reflux. The column usually (although not always) is instrumented in such a way as to require some liquid overflow from the draw tray into the circulating reflux zone to provide a margin for control action. All sidedraw liquid and tray overflow (if any) represents column vapor that was condensed in condensing zones (either circulating reflux sections or the overhead condenser) higher in the column. These zones, because they are higher in the column, are at lower temperatures, and the heat removed is of lesser value because of its lower temperature. Because of this lower value, a process which upgrades the heat from a low grade heat source to a higher grade source has great economic importance. The invention is such a process.

SUMMARY OF THE INVENTION

Accordingly, the invention relates to a process for the fractional distillation of a multi-component liquid in a multiple tray fractional distillation column having at least one sidedraw tray where liquid is withdrawn to provide a sidedraw stream and wherein a circulating reflux stream is withdrawn from the column at a zone or location in the column at least two trays below the sidedraw tray. In particular, the invention comprises a process of the type described in which draw tray overflow is substantially eliminated and a portion of the reflux is removed from the locus of the circulating reflux withdrawal zone. As used herein, the term "total draw of liquid" is understood to allow quite minor amounts of overflow or liquid flow to trays below the sidedraw, while excluding any significant quantity of downward flow of liquid. The term "locus of the circulating reflux withdrawal zone", as used herein, includes, but is not limited to, the column area or trays proximate to the circulating reflux withdrawal tray, as well as the circulating reflux line (preceding, intermediate to, if more than one heat exchanger, and succeeding the heat exchanger(s) employed). For example, the reflux portion may be separated from the circulating reflux line or stream prior to heat exchange and combined with at least a portion of the sidedraw stream, the remainder of the circulating reflux being returned to a zone or location in the column below the sidedraw tray. The heat of condensation of the overflow and that portion of the side draw providing from the circulating reflux is now, as a consequence of the new arrangement, effectively withdrawn from a lower point in the column than before. Accordingly, this heat is available for reuse at a significantly higher temperature. If the sidedraw and circulating reflux system employed are the highest such units in the column, the extra heat made available at the circulating reflux will have been moved effectively from the overhead condenser. The overhead condenser is the lowest temperature at which heat is removed from the system, and in most fractionating columns this heat is lost to cooling water or air. Either the temperature is too low for any use or more heat is available at this temperature level than can be absorbed in the available process sinks. Thus, the improved process, in this case, has upgraded waste heat to a useful temperature level.

In many cases, crude oil distilling columns in particular, the heat removed from circulating reflux systems is used to preheat the feed to the column. The flexibility afforded by this invention to move heat from a lower temperature source to a higher source makes it possible to match more closely the preheating requirements of the feed and to adjust to changing requirements as the feed properties change due to changes, for example, in the source of the crude oil. Thus, the thermal efficiency of the distilling unit is enhanced. When the light components in the sidedraw must be removed in a "stripper" fractionating column, the sidedraw liquid may be fed, as usual, to the top or near-top tray of the stripper, and the portion separated from the circulating reflux is sent to an appropriate location at a point below the top tray. In this way the thermal efficiency of the stripper is improved. In some cases only the sidedraw portion of the product may need to be stripped.

For fractionators such as catalytic cracking unit main fractionators and thermal cracking unit fractionators, circulating reflux heat is often used to reboil distilling columns in the associated gas recovery train. In this case, heat at a temperature level below the lowest recovery column reboiler temperature is usually wasted to cooling water or air. The invention will make it possible to upgrade some of this waste heat to a temperature high enough for use as reboil heat.

The term "tray", as used herein, includes bubble cap, valve type, or perforated plate trays, or modifications thereof, as well as equivalent structures. Packed columns may be used, since "trays" or equivalent structures will be utilized in the collection and removal of liquid. Again, the term "column" is understood to include a single structure or two or more such units in series, the designations of "higher", and "upper" merely referring to cooler temperature zones of such unit or units.

DETAILED DESCRIPTION OF THE INVENTION

In order to describe the invention more fully, reference is made to the accompanying drawing.

Figure 1:
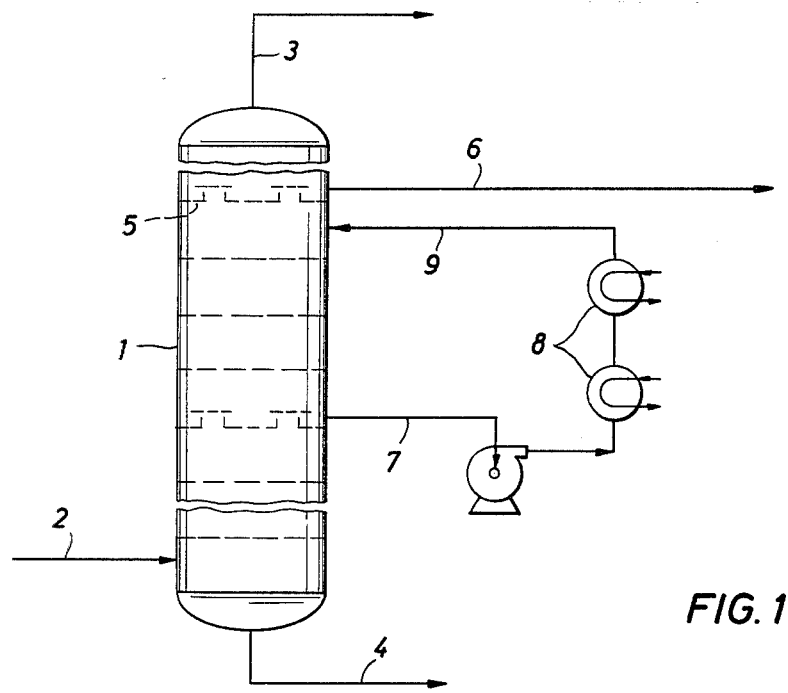
Figure 2:
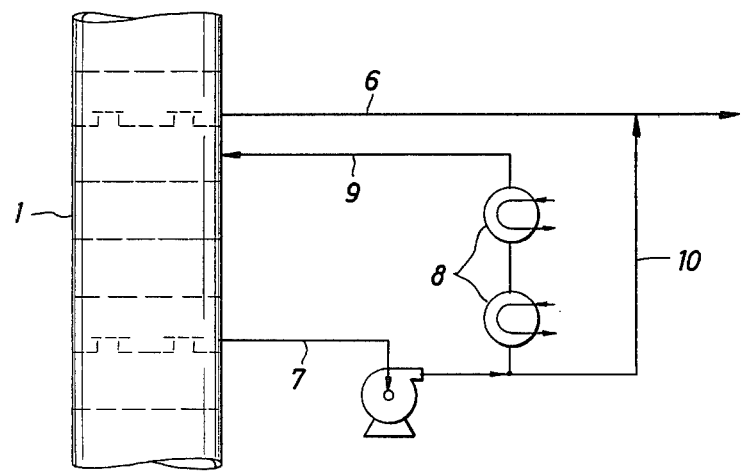
Figure 3:
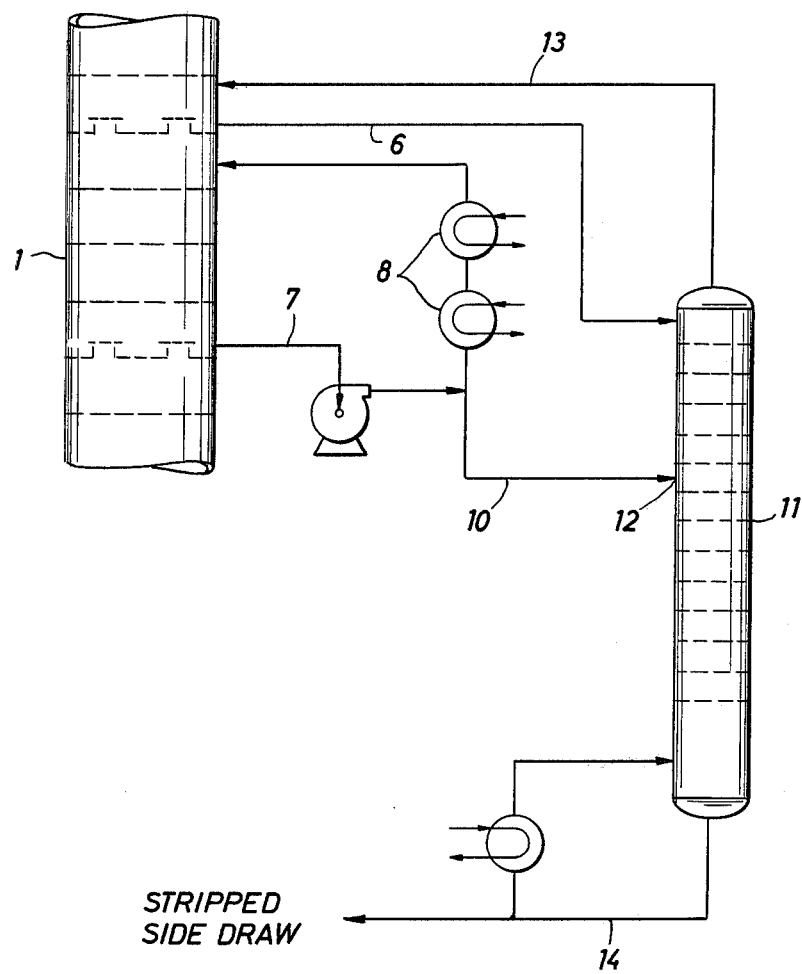
Figure 4:
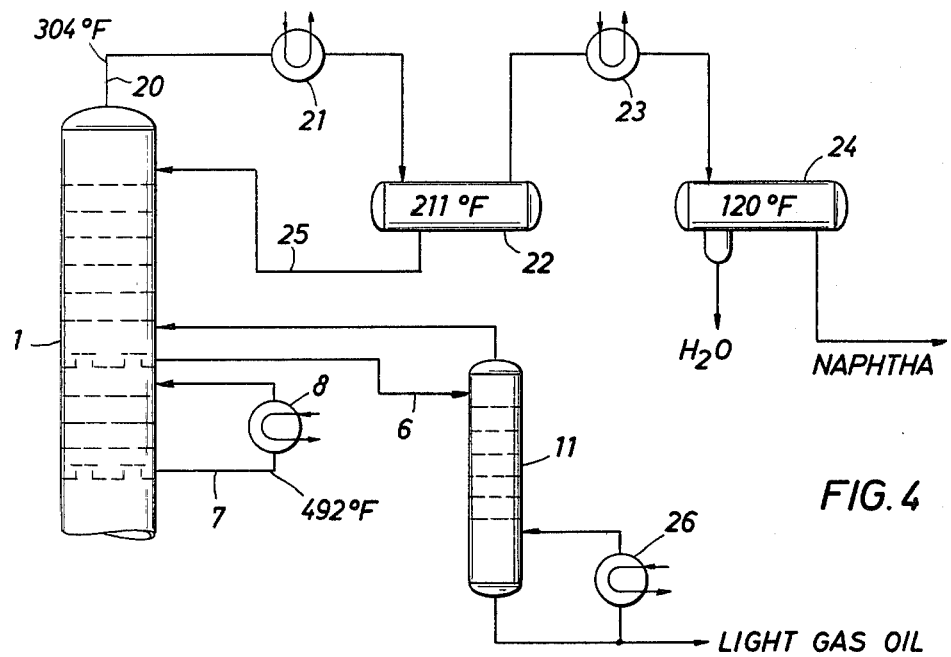
Figure 5:
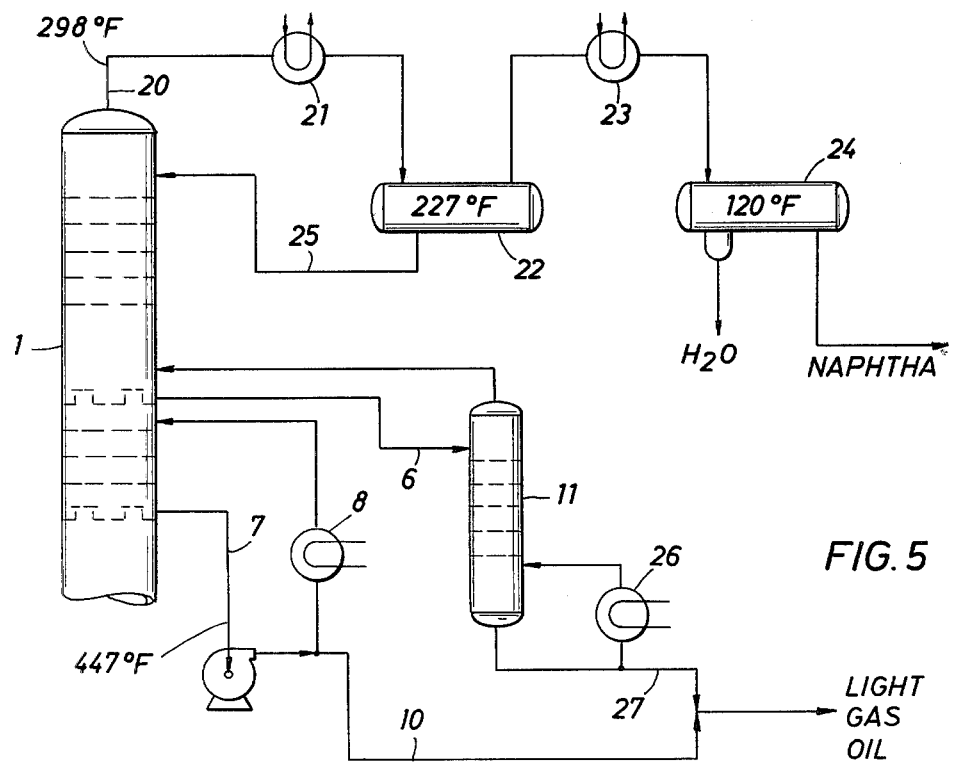

FIGS. 1 and 4 represent schematically the practice prior to the invention, while FIGS. 2, 3 and 5 represent schematically embodiments of the invention.

As illustrated in FIG. 1, a multicomponent liquid, such as crude oil, enters a conventional multiple tray fractional distillation column 1 via line 2. The liquid is fractionally distilled to produce an overhead (line 3), a bottoms fraction (line 4) and a number of liquid fractions, removable at various points in the column. For simplicity, product withdrawal is shown only from tray 5, line 6, although in practice, such columns contain a number of such side withdrawals. As shown, reflux is withdrawn via line 7, passed through heat exchangers 8, and returned via line 9 to a point in column 1 just below tray 5. Tray 5 may or may not be operated to provide liquid overflow. In some instances, the liquid in line 9 is returned to column 1 at a point above tray 5.

In FIG. 2, corresponding numerals represent corresponding elements of FIG. 1. In this embodiment, column 1 is operated in such a way that tray overflow at tray (5) is eliminated. Concomitantly, a minor portion of the liquid withdrawn in line 7 is sent via line 10 and combined with the liquid in or from line 6. The portion of total side product that is withdrawn from the circulating reflux stream will depend on the number of trays and the amounts of reflux in the column section above the sidedraw tray, the degree of fractionation needed, and the conditions of operation and cannot be stated with precision. In general, however, the reflux portion will be from 5 percent to 200 percent by volume of the total side draw stream in line 6. It is within the skill of the art to adjust the volume of circulating reflux utilized as side product to provide the maximum heat recovery within the constraint of sufficient fractionation between products, given the concepts described herein. As noted previously, those skilled in the art will recognize that the liquid does not have to be removed, per se, from line 7, but may be taken from column 1 as a stream in the general vicinity of or proximate to the withdrawal line 7.

In FIG. 3, the portion separated in line 10 is sent to a stripper column 11 where remaining light components are stripped. Entry into column 11 is made at 12 to a point below the top tray. Light components are returned via line 13 to column 1. Product is removed via line 14.

In order to demonstrate the efficiencies available by utilization of the invention, a comparison (calculated) of the prior method versus the procedure of the invention is given in the production of 24,800 barrels per day of light oil (side product) and 8,840 barrels per day of naphtha. As shown in FIG. 4, vapor leaving column 1 via line 20 will be at approximately 304° F., and the required heat transfer in overhead condenser 21 will be 76.5 MMBTU/hr. Liquid in accumulator 22 is at 211° F. Heat transfer in condensation stage 23 will be 44.2 MMBTU/hr, with a liquid temperature of 120° F. in accumulator 24. Reflux to column 1 from accumulator 22 via line 25 will total 29,900 barrels per day. Temperature of the liquid in line 7 will be about 492° F., and heat transfer in exchanger 8 will be 40.0 MMBTU/hr. From line 6, 27,300 barrels per day are provided to stripper column 11, and 14.9 MMBTU/hr are transferred in reboiler 26.

In FIG. 5, by operating in accordance with the invention, the temperature in line 20 will be 298° F., the heat transfer in condenser 21 will be 32.9 MMBTU/hr, and the heat transfer in heat exchanger 23 will be 55.4 MMBTU/hr. Reflux in line 25 is reduced to 13,100 barrels per day. The temperature of the liquid in line 7 will be 447° F., and the heat transfer in heat exchanger 8 will be 68.5 MMBTU/hr. The sidedraw in line 6 will be 13,700 barrels per day and the portion separated in line 10 will total 12,600 barrels per day. The heat transfer at reboiler 26 will be 8.9 MMBTU/hr. Product removed in line 27 will total 12,200 barrels per day, and the combined flows of lines 10 and 27 will thus total 24,800 barrels per day. As is readily evident, the transfer duty of condenser 21 has been substantially reduced, providing more useful transfer in heat exchanger 8. In this example, only the portion of the sidedraw product that is taken from the product draw tray requires stripping, and the stripper size and reboiler duty are significantly reduced.

While the invention has been illustrated with respect to particular apparatus, those skilled in the art will appreciate that, as indicated, other equivalent or analogous structures may be employed. Again, all pumps, valves, entry and exit lines, etc., have not been illustrated, as such expedients can readily be supplied by the skill of the art.

What is claimed is:

1. An improved process for the fractional distillation of a multi-component liquid in a multiple tray fractional distillation column comprising:
    (a) vaporizing the multi-component liquid in said multiple tray fractional distillation column, and fractionating the vapor to provide a vaporous overhead product stream, at least one intermediate sidedraw product stream, and a bottoms stream, the fractionation being carried out under conditions to provide from at least one sidedraw tray of the column a total draw of liquid from the tray;
    (b) withdrawing a circulating reflux stream from a circulating reflux withdrawal zone, said zone being at least two trays below the tray having a total draw of liquid, and removing heat from said circulating reflux stream in a heat exchange zone and returning at least a portion of said circulating reflux stream to a zone in the column below the tray having the total draw of liquid; and
    (c) separating a portion of the reflux from the locus of the circulating reflux withdrawal zone.

2. The method of claim 1 wherein the portion separated in step (c) is separated from the circulating reflux stream before the entry of the stream into the heat exchange zone.

3. The method of claim 1 wherein the portion separated is combined with the liquid from the total sidedraw stream.

4. The method of claim 2 wherein the portion separated in step (c) and the liquid from the total sidedraw stream are sent to a fractional distillation zone, and distilled.

5. The method of claim 1 wherein the liquid from the total sidedraw stream is distilled to provide a product stream which is combined with the portion separated in step (c).

* * * * *